Figure 1:
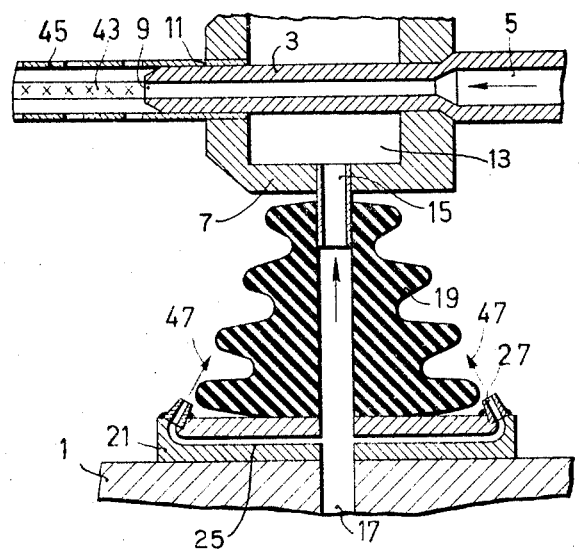

Sept. 20, 1966     K. ZUKOWSKI     3,273,986

METHOD AND DEVICE FOR SEALING TOGETHER GLASS PARTS

Filed Aug. 20, 1962     2 Sheets-Sheet 1

INVENTOR
KURT ZUKOWSKI

BY
*Frank R. Trifari*
AGENT

United States Patent Office 3,273,986
Patented Sept. 20, 1966

3,273,986
METHOD AND DEVICE FOR SEALING TOGETHER GLASS PARTS
Kurt Zukowski, Haaren, near Aachen, Germany, assignor to North American Philips Company, Inc., New York, N.Y., a corporation of Delaware
Filed Aug. 20, 1962, Ser. No. 218,042
Claims priority, application Germany, Aug. 29, 1961, P 27,781
4 Claims. (Cl. 65—40)

This invention relates to methods and devices for sealing together glass parts by means of an electric current led via jets of an ionized gas through the glass parts to be joined which are heated to glowing temperature and thus made electrically conducting.

It is known that the conductivity of glass increases with increasing temperature. This conductivity is utilized for sealing together glass parts. During this process electric current is led via the flame of an ionized gas to a glowing sealing area and passes through it. Another flame striking the sealing area at another point leads the current away from the glass. Due to the passage of current, the sealing area is heated still further so that glass parts pushed against each other melt together more uniformly and more satisfactorily, than in the case where gas flames only would be used for the sealing process. The better and more uniform melting together is due to the flames from gas burners heating substantially the surface of the glass whereas the current passing through the glass also heats the inner zones of the glass.

However, known methods are not fully satisfactory. Thus, one disadvantage is that during the transport of electrical energy through the gas flames, independent arcs between the burner and the glass bulb occur. The arcs reach the glowing glass parts arbitrarily at different points, resulting in the melting zone becoming broader than is desirable. Another disadvantage of the arbitrary path of an arc is the derivation of the electrical energy from the workpoint to metal parts of the welding device, which may give rise to interruption of the sealing process and hence to a poor quality of the sealing area. The arcs may also remain at separate points of the sealing area for too long a period, thus causing in situ overheating of the glass. In this case constituents of the glass are evaporated, resulting in areas of different coefficients of expansion which give rise to harmful stresses in the glass body and thus to fissures liable to produce implosion afterwards.

Finally, the passage of current through the edges of the glass parts to be sealed together is still not so uniform that, in the case of thick walled glass parts, a smooth seal is obtained on the surface facing the burners as well as on that remote therefrom. The rims to be joined are not heated uniformly enough therefore, so that the electric conductivity is not the same throughout the thickness of the wall.

According to the invention, in a method of sealing together glass parts by means of electric current which is transferred via jets of an ionized gas onto the preheated glass parts, the gas jets are enveloped on their way to the sealing area by a nonionized gas.

The enveloping nonionized gas provides for the arc to strike the glass parts to be sealed together at the correct points. Any disadvantage resulting from an arbitrary impact of the light arc is thus avoided. In addition, the gas of the protective gas envelope which is blown onto the glass parts from nozzles surrounding the nozzles for the current conveying gas jets may also serve to cool that side of the glass parts or of the sealing area which are facing the burners. The temperature of the enveloping gas, together with the rate of outflow thereof, are adjustable in order to obtain the required extent of cooling. Cooling the side of the sealing area adjacent the burners results in a uniform current density and hence in a uniform temperature distribution through the sealing area. The use of an enveloping protective gas thus gives rise to sealed areas which are noticeably more uniform and smoother.

Figure 2:
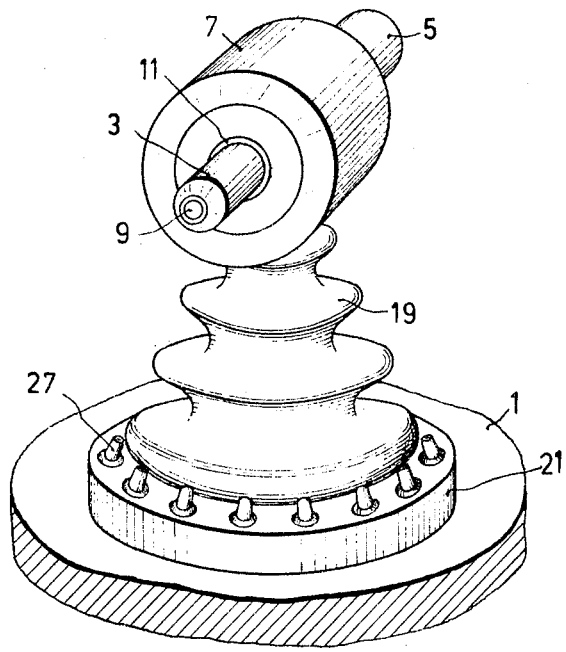
Figure 3:
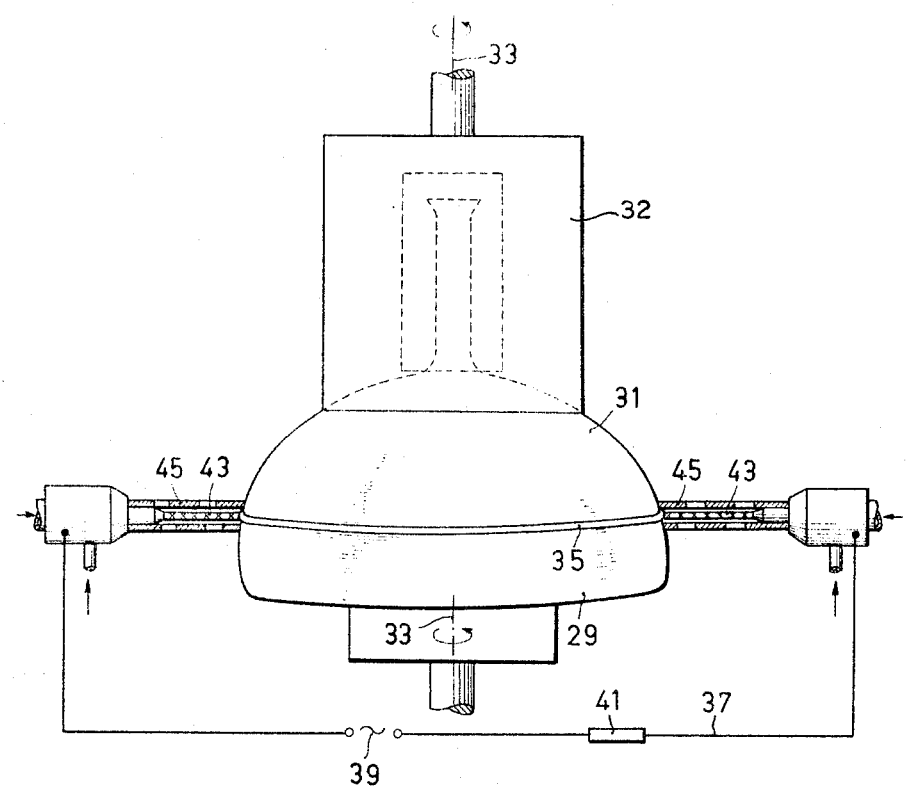

The invention will now be described with reference to the accompanying drawings in which:

FIGURES 1 and 2 show a burner according to the invention;

FIGURE 3 serves to clarify the use of the burner of FIGURE 1 for sealing together the bulb parts of cathode ray tubes.

The base plate 1 of a known sealing device carries a burner (FIGURE 1) comprising an elongated nozzle 3 to which a duct 5 for the gas is connected. The nozzle 3 is surrounded by an envelope 7 seated on the nozzle 3 in a gas-tight manner on the side of the connection for the gas. An annular gap 11 from which the nozzle 3 projects remains between the envelope 7 and the nozzle 3 on the side of the aperture 9 of the nozzle. A connection piece 15 of another gas conduit 17 ends into a hollow space 13 between the nozzle 3 and the envelope 7. The connection piece 15 is secured in an insulating supporting body 19 anchored to a plate 21 and hence to the base plate 1 of the sealing device.

The gas conduit 17 leading to the connection piece 15 extends through the insulating body 19, the plate 21 and the base plate 1 of the sealing device. To prevent sparking between the nozzle 3, 7, which is under high tension, and the base plate 1, or to extinguish any arcs occurring upon sparking, the plate 21 is traversed by ducts 25 which communicate with the gas conduit 17 at the centre of plate 21 and lead to a ring of nozzles 27 at the edge of the plate. The nozzles 27 are directed towards the insulator 19.

FIGURE 3 serves to clarify the use of burners according to the invention for sealing together the bulb parts of a television display tube. A window 29 and a cone 31 of the bulb are first held by the sealing device with some spacing exactly one above the other. The known vacuum holders 32 are shown only diagrammatically for the sake of clarity. The cone and the window rotate at the same speed about the same shaft 33.

By means of gas burners (not shown), the cone 31 and the window 29 have their sealing rims 35 heated to a temperature at which the rims start glowing. Once the rims 35 have reached this temperature, the burners 7 are switched into a current circuit 37 which is supplied with a voltage of about 10 kilovolts from an alternating current source 39. This voltage may naturally be higher or lower according to requirements. The current circuit 37 also includes a series resistor 41. The nozzles 3 also act as gas burners already during the heat-up period. They are operated with a combustible gas with an admixture of $O_2$ and assist the other gas burners. At the moment when the current is switched on, it flows via a hot, ionized gas jet 43 from one burner to the rims 35 to be sealed together. The current passes through said rims and is led away again via the gas jet 43 of the other burner.

At the same time as the current is switched on, air is pressed through the duct 17 into the hollow spaces 13 'round the nozzles 3 and blown through the annular gaps 11 to the rims to be sealed, the air enveloping the gas flames 43 which transport the electric current. The compressed air 45 previously still streaks over a certain length along the projecting nozzles 3, resulting in the enveloping action being improved. The enveloping air flows 45 have a high speed and cause a limitation of the surface area on which the gas flames 43 strike the sealing area. Once the gas flames and the electric current have reached the desired temperature, the rims 35 are pushed against each other and sealed together. The compressed air now assists in cooling the outer surface area of the rim governed by the flames 43, so that the electric current passes more towards the interior.

Flashover of the electric current between the nozzles and the base plate 1 is prevented by air flows 47 blown out of the nozzles 27 along the insulator 19.

Both the outflow speed of the compressed air from the annular gaps 11 and the temperature of the outflowing gas are adjustable, thus permitting the surface of the sealing area to be cooled to a greater or lesser extent.

What is claimed is:

1. A method of sealing glass parts together comprising the steps, heating the glass parts to soften the same, conducting an electric current through a jet of ionized gas to the heated glass parts and seal them together; and enveloping the jet of ionized gas conducting the electric current with a current of nonionized gas coaxial with the jet to limit the surface area on which the ionized gas strikes the sealing area and to aid in cooling the area of the glass parts surrounding that struck by the jet of ionized gas.

2. A method of sealing together glass parts comprising the steps, heating the glass parts with a jet of heated gas to soften the same, conducting an electric current through the heated gas jet to ionize the same further heating the glass parts, bringing the heated glass parts into abutting relationship to seal them together, and enveloping the ionized gas jets in a current of nonionized gas coaxial with the gas jet to limit the surface area on which the ionized gas strikes the sealing area of the glass parts surrounding that struck by the jet of ionized gas.

3. A method of sealing together glass parts as defined in claim 2 in which the nonionized gas is air.

4. A device for sealing glass parts together comprising a nozzle directing a jet of heated gas toward the glass parts, means to apply an electric current through the jet of heated gas which passes into the glass parts further heating the same while ionizing the gas jet, a tubular member surrounding the nozzle forming an annular aperture therewith, and means to direct a flow of nonionized gas through said aperture to coaxially envelope the ionized gas jet.

References Cited by the Examiner
UNITED STATES PATENTS 2,579,222  12/1951  Wilder _____ 65—40
2,590,173  3/1952  Guyer _____ 65—40 X DONALL H. SYLVESTER, Primary Examiner.

G. R. MYERS, Assistant Examiner.